Patented Dec. 8, 1931

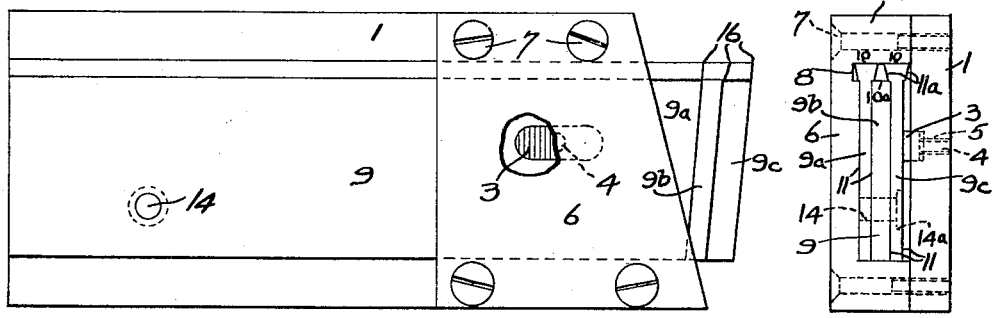
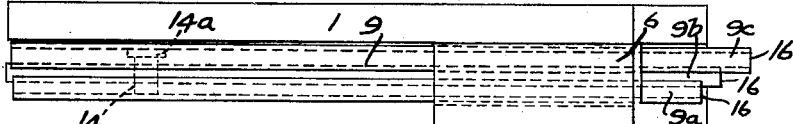
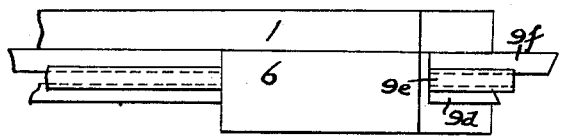
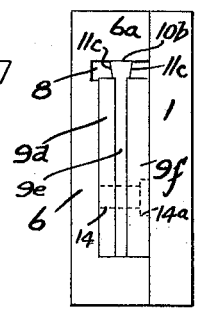
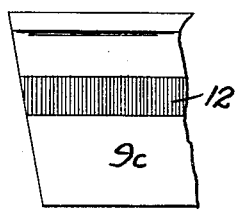

1,835,958

UNITED STATES PATENT OFFICE

JOHN M. LUERS, OF DETROIT, MICHIGAN

FORMING TOOL HOLDER AND CUTTER THEREFOR

Application filed July 5, 1929. Serial No. 375,921.

This invention relates to improvements in forming tool holders and cutters therefor. At the present time the usual practice is to make forming cutters out of one piece of stock, and, particularly where sharp angles are necessary between portions of the cutting surface, considerable time and skilled labor is required for their fabrication.

It is an object of the invention to provide a compound forming cutter consisting of a plurality of blades secured side by side thereby materially reducing the cost of manufacture, and also a holder in which these blades may be securely held relative to one another.

Another object of the invention is to provide a forming tool cutter wherein the cutting surface of each blade is on a different horizontal plane to that of the blade, or blades, adjacent to it, and wherein the outwardly projecting blades have their sides tapered towards one another for a short distance from their cutting edges so that a shoulder is formed along the base of each tapered portion against each of which one margin of the cutting surface of one of the adjacent blades lies. Thus each alternate blade is so formed that it extends over the marginal portions of the blades adjacent to it, and thereby eliminates the possibility of unmachined portions of the work occurring between the blades which go to make up the cutter.

With these and other objects and advantages in view which will become apparent as the specification proceeds, the invention is hereinafter more fully described with the aid of the accompanying drawings, in which:

Figure 1 illustrates a side view,

Figure 2 an end view, and

Figure 3 a plan view of the invention.

Figures 4 and 5 show a plan view and an end view respectively of a slightly different cutter arrangement.

Figure 6 is a detail.

Referring to the drawings, 1 designates a flat plate having a recess 2 formed in one side thereof to receive a locking member 3 which is, on one side, vertically serrated, and is adapted to be moved transversely of the plate 1 by a screw 4 in threaded engagement with an aperture 5 through the said plate. 6 denotes a support having inwardly projecting margins 6a the extremities of which bear against the upper and lower margins of the side of the plate 1 in which the recess 2 is formed. The support 6 is held relative to the plate 1 as by screws 7.

Adjacent the underside of the upper projecting margin 6a a longitudinal groove 8 is formed in the inner side of the support 6. The distance between the inner side of the support 6 and the adjacent side of the plate 1 should be slightly in excess of the total width of the cutter 9 which is to be employed. In Figures 1, 2 and 3 and Figures 4 and 5 cutters are shown which each consist of three blades 9a, 9b and 9c, and 9d, 9e and 9f respectively, though of course any desired number of blades may be employed.

In Figures 1, 2 and 3 the cutter 9 consists of two higher blades 9a and 9c between which a shallower blade 9b is positioned.

The portions 11a of the sides of the blades 9a and 9c immediately beneath their cutting surfaces 10 are downwardly and inwardly tapered for a short distance, and the lower portions 11 of the sides of these blades are substantially parallel, whereas the sides of the shallower blade 9b are substantially parallel throughout their entire height. In the preferred construction of the blades 9a and 9c the width of their lower portions 11 is such that a square shoulder is formed under the lower ends of the tapered side portions 11a. The intermediate blade 9b is placed with the margins of its cutting edge 10a resting against the aforesaid shoulders on the adjacent sides of the blades 9a and 9c. The blade 9c has serrations 12 on one side with which the serrations on the locking member 3 coact, and pressure exerted on the latter against the blade 9c forces the blade 9a against the inner side of the support 6. As clearance is afforded by the groove 8 for the adjacent tapered portion 11a of the blade 9a, the portion 11 of its adjacent side is forced into contact with the support and thus the whole cutter is frictionally held.

In Figures 4 and 5 the arrangement is the same except that the outer blades 9d and 9f are shallower and the central blade 9e is higher and provided with tapered side portions 11c adjacent its cutting surface 10b.

It will be noted that the higher blades 9a, 9c and 9e are so positioned that the margins of their cutting surfaces 10 and 10b overlap the marginal portions of the shallower blades 9b, 9d and 9f adjacent to them. This overlapping condition eliminates the possibility of unmachined portions remaining on the work between the portions cut by the blades. The cutting edges 16 of the blades are, of course shaped to cut the desired form.

The support 6 should be of sufficient length to insure the component parts of the cutter 9 remaining in correct alignment. The blades 9a, 9b and 9c, or 9d, 9e and 9f, are also held relative to one another by a pin 14 which extends through aligned apertures in the blades, and has a head 14a which fits into an enlarged portion of the aperture in the blade 9c, or 9f, on its side adjacent the plate 1, by which latter the pin is held against accidental disengagement.

While in the foregoing the preferred embodiment of the invention has been described and shown, it is understood that the construction is susceptible to such alterations and modifications as fall within the scope of the appended claim.

What I claim is:

A forming tool consisting of a flat plate, a support the upper and lower portions of which project against and are secured to said plate, the intermediate portion of said support being spaced from said plate and lying parallel with the latter, a longitudinal groove formed in the inner side of said support immediately beneath its upper projecting portion, at least two blades parallel with said plate extending between it and said intermediate support portion, the cutting surface of each blade being on a different horizontal plane and parallel with the cutting surface of the blade next to it, cutting edges formed across the ends of said cutting surfaces, the upper portions of the sides of the higher blade being downwardly and inwardly tapered from its cutting surface and the lower portions of the sides of the higher blade being substantially parallel with one another so that shoulders are formed at the junction of the tapered with the parallel portions, the shallower blade resting with the adjacent margin of its cutting surface against the shoulder formed along the base of one of the tapered side portions of the higher blade, the other tapered side portion of the higher blade extending into said longitudinal groove, the portions of the sides of the higher blade remote from its cutting surface and the sides of the shallower blade being parallel with one another, and means for exerting pressure transversely of said blades so that they may be held frictionally against said support.

JOHN M. LUERS.